United States Patent
Tiirola et al.

(10) Patent No.: US 7,492,837 B2
(45) Date of Patent: **\*Feb. 17, 2009**

(54) PARAMETER ESTIMATION FOR ADAPTIVE ANTENNA SYSTEM

(75) Inventors: Esa Tiirola, Oulu (FI); Kari Horneman, Oulu (FI); Kari Pajukoski, Oulu (FI); Juha Tapani Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 416 days.

This patent is subject to a terminal disclaimer.

(21) Appl. No.: 10/465,995

(22) PCT Filed: Dec. 20, 2001

(86) PCT No.: PCT/EP01/15152

§ 371 (c)(1), (2), (4) Date: Nov. 24, 2003

(87) PCT Pub. No.: WO02/054618

PCT Pub. Date: Jul. 11, 2002

(65) Prior Publication Data
US 2004/0102203 A1  May 27, 2004

(30) Foreign Application Priority Data
Dec. 29, 2000 (GB) ................. 0031834.5

(51) Int. Cl.
*H04L 27/00* (2006.01)
(52) U.S. Cl. ..................... 375/324; 370/320
(58) Field of Classification Search ........... 375/316, 375/324; 370/320
See application file for complete search history.

(56) References Cited

U.S. PATENT DOCUMENTS

| | | | |
|---|---|---|---|
| 6,108,565 A | | 8/2000 | Scherzer |
| 6,430,166 B1 * | | 8/2002 | Bejjani et al. ............... 370/320 |
| 6,754,473 B1 * | | 6/2004 | Choi et al. .................. 455/101 |
| 6,914,932 B1 * | | 7/2005 | Miya et al. .................. 375/150 |
| 2002/0137548 A1 * | | 9/2002 | Miya .......................... 455/562 |
| 2004/0076132 A1 * | | 4/2004 | Tiirola et al. ................ 370/335 |

FOREIGN PATENT DOCUMENTS

EP  0 952 682 A2  10/1999

(Continued)

OTHER PUBLICATIONS

Ericsson, "CR 25.211-079r1: Clarification of downlink phase reference", TSG-RAN Working Group 1 meeting #16, TSGR1#16(00)-1258, 3GPP, Oct. 10-13, 2000, Pusan, Korea.

Japanese Office Action dated Sep. 19, 2006 (with partial English translation).

(Continued)

*Primary Examiner*—Chieh M. Fan
*Assistant Examiner*—Freshteh N Aghdam
(74) *Attorney, Agent, or Firm*—Squire, Sanders & Dempsey L.L.P.

(57) ABSTRACT

There is proposed a technique for determining parameters, especially channel estimation, in the receiver of a communication system utilising adaptive antenna techniques. The technique uses information transmitted in the antenna signals and in the beam signals to determine the parameters.

12 Claims, 2 Drawing Sheets

FOREIGN PATENT DOCUMENTS

| | | |
|---|---|---|
| EP | 0 977 371 A2 | 2/2000 |
| JP | 07-087011 | 3/1995 |
| JP | 10/190618 | 7/1998 |
| JP | 11-252002 | 9/1999 |
| JP | 2000-4212 | 7/2000 |
| JP | 2000-50365 | 6/2005 |
| WO | WO/99/14870 | 3/1999 |
| WO | WO 00/51389 | 8/2000 |

OTHER PUBLICATIONS

Universal Mobile Telecommunications System (UMTS); Physical channels and mapping of transport channels onto physical channels (FDD) (3GPP TS 25.211 version 3.4.0 Release 1999), ETSI TS 125 211 V3.4.0 Sep. 2000, XP 002185178, retrieved from the Internet: http://pda.etsi.org/pda/queryform.asp, retrieved on Dec. 10, 2001.

* cited by examiner

PARAMETER ESTIMATION FOR ADAPTIVE ANTENNA SYSTEM

FIELD OF THE INVENTION

The present invention relates to a technique for estimating parameters in the receiver of an adaptive antenna system, and particularly but not exclusively to channel estimation in the receiver of a mobile station in a mobile communication system.

BACKGROUND TO THE INVENTION

In wide-band code division multiple access (W-CDMA) systems, one of the most demanding tasks having a significant effect on the performance of the receiver is the channel estimation, in which the complex channel coefficients are estimated. The goal of channel estimation is to cancel the distortion caused to the transmitted signal by the radio channel such that as perfect a replica of the transmitted signal is retrieved as is possible. This can be achieved by coherent demodulation in which the received signal is multiplied with the complex conjugated channel estimate. However, in multi-path fast fading conditions the coherent detection is difficult to achieve and a channel estimation method is required that works satisfactorily under the challenging fast fading circumstances.

The channel multi-path profile heavily affects the performance of the channel estimation due to the fact that the estimation must be done individually in each temporal rake finger of the rake receiver. The more multi-path components in the channel, the lower the signal-to-noise ratio (SNR) per rake finger, since the channel energy is distributed in the propagation paths.

In the forward link, i.e. the down-link, of a wide-band code division multiple access (WCDMA) system, a primary common pilot channel (P-CPICH) is broadcast over the entire cell or a sector. The P-CPICH is broadcast also in the case of a multi-beam arrangement (multiple beams per sector) and in user specific beam-forming. Therefore there always exists one such channel per sector regardless of the applied transmission scheme.

In systems utilising adaptive antenna techniques, dedicated channels are usually transmitted through a narrow beam, which means that the P-CPICH and the down link dedicated physical channels (DL-DPCH) usually experience different channel characteristics on transmission to a mobile station antenna.

In current known systems, the down-link dedicated physical control channel (DL-DPCCH) is used as the phase reference for the DL-DPCH in adaptive antenna systems because of the fact that the P-CPICH does not experience the same channel characteristics.

It is therefore an aim of the present invention to provide an improved technique for estimating parameters in the receiver of an adaptive antenna system.

SUMMARY OF THE INVENTION

According to a first aspect of the present invention there is provided a method of determining characteristics of a transmitted signal in a receiver of a communication system having an adaptive antenna transmitter comprising: receiving a beam signal; receiving an antenna signal; and estimating parameters of the received beam signal based on information received in the received antenna signal.

The step of estimating parameters may be further based on the received beam signal.

The antenna signal, in this context, is the signal that is broadcast for many users commonly (transmitted over the entire sector) whereas the beam signal is a user specific transmission (a group of users—specific transmission in the case of multi-beam system). It is also possible to generate the antenna signal by transmitting it from all the elements of the antenna array. The beam signal is generally transmitted over a part of the sector. In the case of adaptive antenna transmission schemes, the so-called antenna, and beam signals can experience different channel characteristics on transmission to a mobile station antenna.

The antenna signal may include a common pilot channel, the step of estimating parameters being based on signals received in the common pilot channel. The beam signal may include a dedicated pilot channel, the step of estimating parameters being further based on signals received in the dedicated pilot channel.

The communication system is preferably a W-CDMA system.

The antenna signal may include a primary common pilot channel. The step of estimating parameters may utilise pilot signals transmitted in the primary common pilot channel.

The beam signal may include a secondary common pilot channel (S-CPICH). The step of estimating parameters may utilise pilot signals transmitted in the secondary common pilot channel.

The beam signal may include a dedicated physical channel. The step of estimating parameters may utilise signals transmitted in the dedicated physical channel (both control and data symbols of DL-DPCH).

The step of estimating parameters may be based on the joint usage of signals transmitted in the P-CPICH, S-CPICH and DL-DPCH.

The step of estimating parameters may include a channel estimation step. The channel estimate of the beam signal may be calculated by exploiting the statistical properties between the beam signal and antenna signal. The channel estimate of the beam signal may be calculated by exploiting à priori knowledge of the antenna signal. The channel estimate of the beam signal may be calculated by exploiting further à priori knowledge of the beam signal.

The channel may be estimated as:

$$\hat{h}_{joint} = \hat{\beta}\hat{h}_{DL\text{-}DPCCH} + (1-\hat{\beta})\hat{h}_{P\text{-}CPICH}$$

wherein $\hat{h}_{P\text{-}CPICH}$ is a channel estimate obtained from the antenna signal and $\hat{h}_{DL\text{-}DPCCH}$ is a channel estimate obtained from the beam signal, and $\hat{\beta}$ is a weight factor.

In a further aspect the present invention provides a method of determining channel estimation in a receiver of a W-CDMA communication system having an adaptive antenna transmitter comprising: receiving a beam signal having a dedicated physical channel; receiving an antenna signal having a primary common pilot channel; and performing channel estimation on the received beam signal based on pilot signals received in the primary common pilot channel.

The channel estimation may be additionally based on dedicated pilot and/or data symbols received in the dedicated physical channel.

The beam signal may also include a secondary common pilot channel (S-CPICH). The step of estimating parameters may utilise pilot signals transmitted in the secondary common pilot channel.

The step of estimating parameters may be based on the joint usage of signals transmitted in the P-CPICH, S-CPICH and DL-DPCH.

In a still further aspect the present invention provides a receiver of a communication system having an adaptive antenna transmitter comprising: first input means for receiving a beam signal; second input means for receiving an antenna signal; and estimating means, connected to the second input means, for estimating parameters of the received beam signal based on information received in the antenna signal.

The estimating means may be further connected to the first input means, for estimating the parameters based on information additionally received in the beam signal.

The antenna signal may include a common pilot channel, the information being received in the common pilot channel.

The beam signal may include a dedicated channel, the information being additionally received in the dedicated channel.

A W-CDMA system may include such a receiver. A W-CDMA system may include at least one mobile station including such a receiver.

The antenna signal may include a primary common pilot channel. The step of estimating parameters may utilise pilot signals transmitted in the primary common pilot channel.

The beam signal may include a dedicated physical channel. The estimation of parameters may utilise pilot signals transmitted in the dedicated physical channel.

The beam signal may include a secondary common pilot channel (S-CPICH), the information being additionally received in the secondary common pilot channel.

The estimation of parameters preferably includes a channel estimation step.

BRIEF DESCRIPTION OF THE FIGURES

The invention will be best understood by way of example with reference to the following Figures in which.

DESCRIPTION OF THE PREFERRED EMBODIMENT

Figure 1:
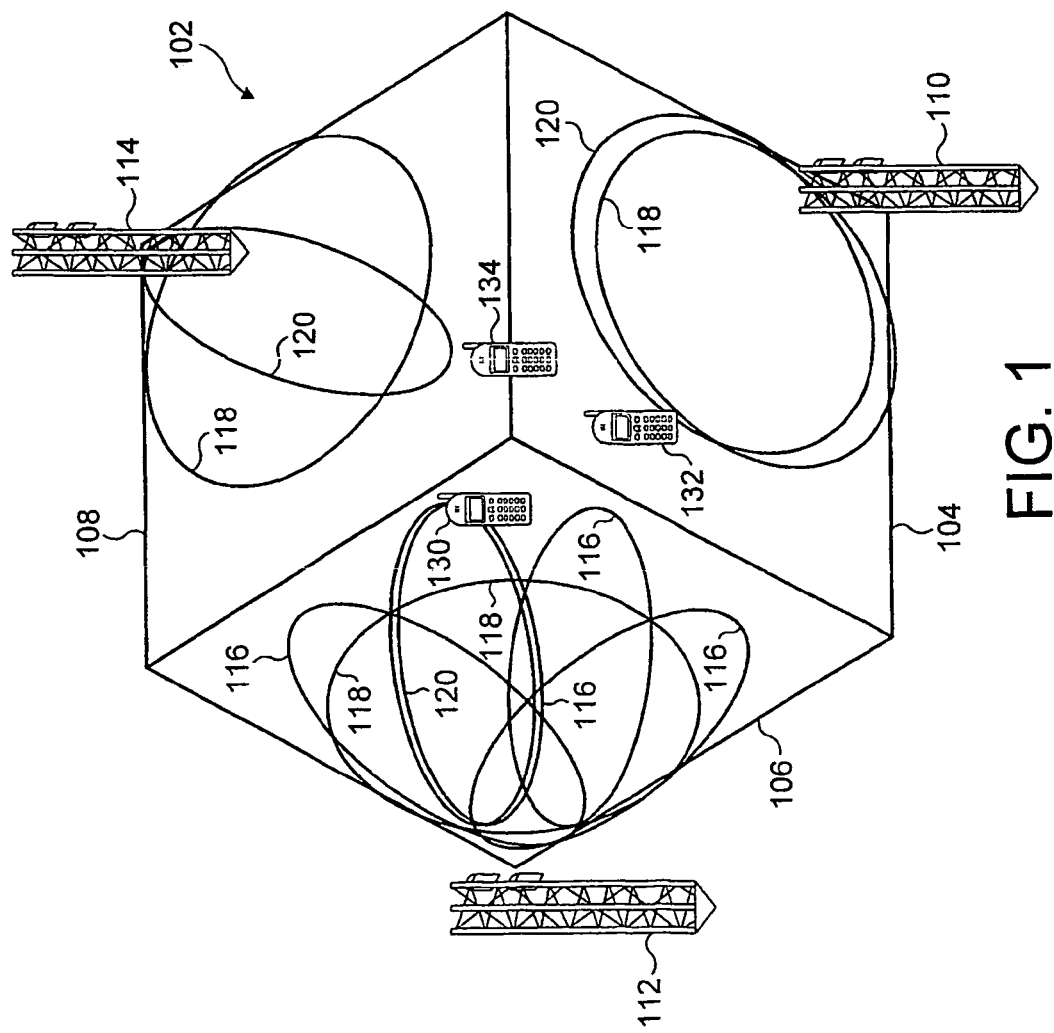
FIG. 1 illustrates exemplary W-CDMA base station cells utilising different transmission schemes in each cell (three-sectorised configuration)

With reference to FIG. 1, there is now described examples of multi-sector W-CDMA cells with respect to which the invention is illustrated. The invention is not, however, in any way limited to such a specific example.

A plurality of mobile stations, or user equipment roam within the cell. For example, as shown in FIG. 1, mobile station 130 is connected in cell 106, mobile station 132 is connected in cell 104, and mobile station 134 is connected in cells 104 and 108. The base station cell 102 is divided into N sectors, where N=3 in the example of FIG. 1.

As exemplified by sector 106 of FIG. 1, each sector can be divided into either K fixed beams or steerable (user specific) beams using a base transceiver station 112. The beams 116 represent the secondary common pilot channel, the beam 120 the down-link dedicated physical channel, and the beam 118 the primary common pilot channel.

Sector 104 of FIG. 1 illustrates the traditional single antenna transmission scheme utilizing a base transceiver station 110. The beam 120 the down-link dedicated physical channel, and the beam 118 the primary common pilot channel.

Sector 108 of FIG. 1 illustrates user specific beam-forming using a base transceiver station 114. The beam 120 the down-link dedicated physical channel, and the beam 118 the primary common pilot channel.

FIG. 1 thus illustrates the CPICHs needed in the different transmission schemes, and the DL-CPCH of a single user.

For the purposes of describing the present invention, two of the three base transceiver stations of the example of FIG. 1 use adaptive antenna techniques for communicating with mobile stations in the various sectors of the cell. The two cells utilizing adaptive antenna techniques are cells 106 and 108. Adaptive antenna techniques are well-known in the art, and the present invention is not directly concerned with any specific implementation details of such techniques. As a skilled person will be familiar with, when using adaptive antenna techniques the base transceiver station 100 transmits mobile specific data to a mobile station through a narrow beam.

The W-CDMA specification defines three different types of pilot channels in the forward link for an adaptive antenna system. These pilot channels are:
1. P-CPICH (Primary Common Pilot Channel);
2. S-CPICH (Secondary Common Pilot Channel); and
3. Dedicated pilot symbols in DPCCH (Dedicated Physical Control Channel).

The P-CPICH is broadcast over an entire sector in a multi-sector arrangement, and there exists only one such channel for each sector. The P-CPICH is used in the hand-over measurements and cell selection/reselection procedures. Another function of the P-CPICH channel, when the common channels are not associated with dedicated channels or not involved in adaptive antenna techniques, is to aid the channel estimation at the mobile station for the dedicated channels, and to provide a channel estimation reference for the common channels.

The S-CPICH may be transmitted over the entire cell or over only part of the cell. There may be zero, one or several S-CPICHs per cell or sector. One typical area of S-CPICH usage is operations with base stations having multiple (fixed) beams per sector. The S-CPICHs are used for identifying different beams at the mobile station.

The dedicated pilot symbols are multiplexed into the down-link dedicated physical channel (DPCH). They are used in signal-to-interference ratio (SIR) estimation and are also used in the channel estimation. If the mobile station or user equipment is informed that the P-CPICH is not the phase reference and there is no S-CPICH available, then the dedicated pilot bits in the DL-DPCCH are the phase reference for the DL-DPCH. This may happen, for example, in the case of user-specific beam forming.

In accordance with the present invention, it is proposed to use the primary common pilot channel P-CPICH for estimating parameters in a mobile station or user equipment of the adaptive antenna system. Preferably, as described in further detail hereinbelow, the primary common pilot channel is used in combination with the existing channels for estimating parameters. Particularly advantageously, the primary common pilot channel is used in channel estimation in the mobile station.

Even though user specific beam forming is applied in adaptive antenna systems, the P-CPICH must be broadcast. This means that there is a strong-powered pilot channel that is available to all mobile stations. In many cases, the SNR of the continuous and non-power-controlled P-CPICH is much better than that of time-multiplexed and power-controlled DL-DPCCH. The relative difference of SNRs (P-CPICH vs. DL-DPCH) gets biggest when the mobile station is situated near to the base station.

A proposed implementation of a channel estimation technique in accordance with the present invention is provided hereinafter.

In the general case the joint channel estimation scheme is preferably designed to be adaptive since the channel characteristics change as a function of time. The adaptivity of the joint channel estimator could be based for example on the correlation measurement. The following equations explain one possible way to implement the joint channel estimator. The joint solution is calculated as $$\hat{h}_{joint} = \hat{\beta}\hat{h}_{DL-DPCCH} + (1-\hat{\beta})\hat{h}_{P-CPICI} \quad (1)$$

in which $\hat{h}_{P-CPICH}$ and $\hat{h}_{DL-DPCCH}$ are the channel estimates obtained from the P-CPICH and DL-DPCCH and $\hat{\beta}$ is the weight factor. The weight factor can be calculated as $$\hat{\beta} = \frac{(1-\bar{\rho}) \cdot S\hat{N}R_{h_{DL-DPCCH}}}{(1-\bar{\rho}) \cdot S\hat{N}R_{h_{DL-DPCCH}} + \bar{\rho}S\hat{N}R_{h_{P-CPICH}}}, \quad (2)$$

in which the expectation value of the time variant correlation coefficient, $\bar{\rho}$, is calculated as $$\bar{\rho} = E\left[\frac{conj(\hat{h}_{P-CPICH}) \cdot \hat{h}_{DL-DPCCH}}{|\hat{h}_{P-CPICH}| \cdot |\hat{h}_{DL-DPCCH}|}\right]. \quad (3)$$

Figure 2:
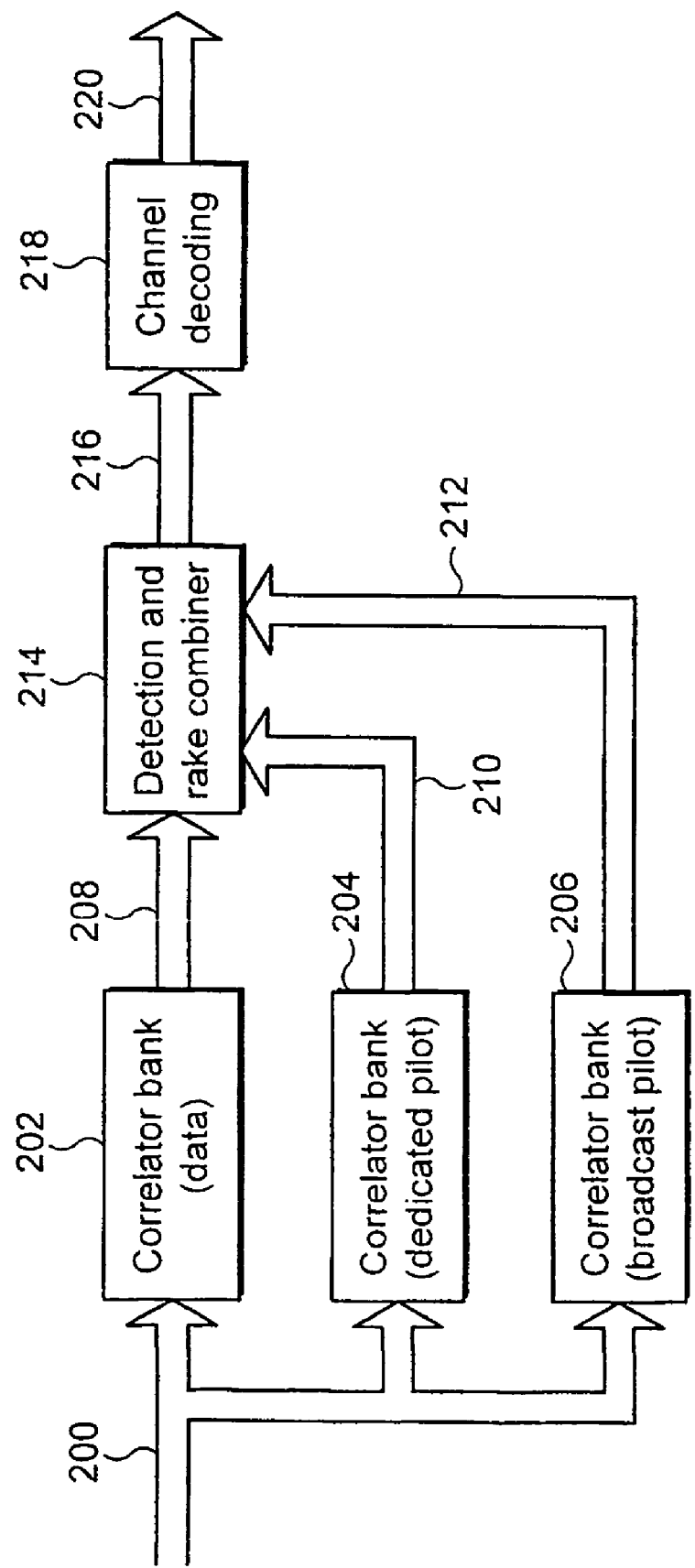
FIG. 2 illustrates in block diagram form elements of a receiver necessary for implementing the present invention.

Referring to FIG. 2, there is illustrated a block diagram of the main elements of a receiver suitable for implementing the present invention in an exemplary W-CDMA system. Referring to FIG. 2, there is provided three correlator banks 202, 204 and 206. There is further provided a detection and rake combiner 214, and a channel decoding block 218.

The correlator bank 202 acts as an input means to the receiver for normal data transmission. The correlator bank 204 acts as an input means to the receiver for the dedicated pilot channels in the beam signal from the transmit antenna. The correlator bank 206 acts as an input means to the receiver for the broadcast channels in the antenna signal from the transmit antenna.

The three correlator banks perform the correlation for the respective signals, all of which are received at the receiver antenna as generally indicated by line 200.

Each of the outputs of the correlators 202, 204, and 206 produces a respective output on lines 208, 210 and 212, which form inputs to the detection and rake combiner 214. The output of the rake combiner 214 on line 216 is provided to the channel decoding block. The channel decoded signal is then provided on line 220 for further processing.

There can be a significant correlation between the beam signal and the antenna signal in the case of user specific beam forming. Correlation between the P-CPICH and DL-DPCCH can be increased if the P-CPICH is transmitted via all of the antenna elements (instead of single antenna only). The narrower the angular spread (seen from the base transceiver station) the more correlated the antenna and beam signals are. The correlation property can be seen from the fact that P-CPICH based channel estimation (antenna signal) performs well (depending on the angular spread) even though the DL-DPCHs are transmitted through the beam signal. The correlation property can be exploited by using both P-CPICH and DL-DPCCH in the channel estimation of DL-DPCH (joint channel estimation).

If the angular spread in the radio channel is small and the SNR per tap low (noise limited environment) the P-CPICH based scheme performs better than DL-DPCCH based channel estimation. However, at high SNR values the dedicated pilot based scheme performs better than the P-CPICH based scheme. The performance of channel estimation can thus be improved even by selection combining (compared to P-CPICH and DL-DPCCH only based schemes). On the other hand, if both P-CPICH and DL-DPCCH are used in the channel estimation of DL-DPCH (joint channel estimation) all energy of the transmitted pilot signal could be utilized. Thus the joint estimation is expected to always be better than either P-CPICH nor DL-DPCCH only based schemes.

The S-CPICH can also be used to aid the channel estimation at a mobile station for the dedicated channels, for example, in the case of multi-beam transmission. Thus, the principle of joint parameter estimation could be applied also in the case of S-CPICH transmission (S-CPICH & P-CPICH, S-CPICH & P-CPICH & DL-DPCH).

In a macro-cellular radio environment it is assumed that: the angular spread is typically relatively low; there are multiple channel taps (SNR per channel tap is low, noise limited area from the parameter estimation point of view); multiple channel taps (each tap is a separate cluster in the angular domain); LOS (strong correlation, narrow angular spread); and the speed of mobile can be high.

The present invention thus provides a technique in which the correlation between the beam signal (DL-DPCH) and the antenna signal (P-CPICH) in the parameter estimation (especially channel estimation) is used. This correlation is advantageously exploited in a joint channel estimation scheme, which is preferably adaptive since the correlation properties change as a function of time. The adaptivity of the joint channel estimator may be based, for example, on the correlation measurement.

The invention claimed is:

1. A method comprising:
   receiving a beam signal at a receiver of a communications system;
   receiving an antenna signal at the receiver; and
   estimating parameters of the received beam signal based on information received in the received antenna signal,
   wherein estimating the parameters includes channel estimation,
   wherein the estimating of the parameters is further based on the received beam signal, and
   wherein the antenna signal includes a common pilot channel, and estimating the parameters is based on signals received in the common pilot channel,
   wherein the communication system is a cellular communication system and said cellular communication system comprising a plurality of cells, each cell comprising at least one sector,
   wherein the antenna signal is transmitted over an entire sector and the beam signal is transmitted over a part of a sector,
   wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor, and wherein the weight factor is calculated as:

$$\hat{\beta} = \frac{(1-\bar{\rho}) \cdot S\hat{N}R_{h_{DL-DPCCH}}}{(1-\bar{\rho}) \cdot S\hat{N}R_{h_{DL-DPCCH}} + \bar{\rho} S\hat{N}R_{h_{P-CPICH}}},$$

where $\bar{\rho}$ is the expectation value of the time variant correlation coefficient and $S\hat{N}R$ is the estimate of the signal-to-noise-ratio of the signal.

2. A method comprising:
receiving a beam signal at a receiver of a communication system, the receiver having an adaptive antenna transmitter, wherein the communication system is a cellular system comprising a plurality of cells, each cell comprising at least one sector;
receiving an antenna signal at the receiver; and
estimating parameters of the received beam signal based on information received in the received antenna signal,
wherein estimating the parameters includes channel estimation,
wherein the antenna signal is transmitted over an entire sector and the beam signal is transmitted over part of a sector and the estimating of the parameters is further based on the received beam signal wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor.

3. A method comprising:
receiving a beam signal at a receiver of a communication system, the receiver having an adaptive antenna transmitter, wherein the communication system is a cellular system comprising a plurality of cells, each cell comprising at least one sector;
receiving an antenna signal at the receiver; and
estimating parameters of the received beam signal based on information received in the received antenna signal,
wherein estimating the parameters includes channel estimation,
wherein the antenna signal is transmitted over an entire sector and the beam signal is transmitted over part of a sector and the estimating of the parameters is further based on the received beam signal wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor;
wherein the weight factor is calculated as:

$$\hat{\beta} = \frac{(1-\bar{\rho}) \cdot S\hat{N}R_{h_{DL-DPCCH}}}{(1-\bar{\rho}) \cdot S\hat{N}R_{h_{DL-DPCCH}} + \bar{\rho} S\hat{N}R_{h_{P-CPICH}}},$$

where $\bar{\rho}$ is the expectation value of the time variant correlation coefficient and $S\hat{N}R$ is the estimate of the signal-to-noise-ratio of the signal;
wherein the expectation value of the time variant correlation coefficient, $\bar{\rho}$, is calculated as $$\bar{\rho} = E\left[\frac{conj(\hat{h}_{P-CPICH}) \cdot \hat{h}_{DL-DPCCH}}{|\hat{h}_{P-CPICH}| \cdot |\hat{h}_{DL-DPCCH}|}\right],$$

wherein conj (·) is the complex conjugation of the argument.

4. A method comprising:
receiving a beam signal having a dedicated channel at a receiver, the receiver having an adaptive antenna transmitter, wherein the communication system is a cellular system comprising a plurality of cells, each cell comprising at least one sector;
receiving an antenna signal at a receiver, the antenna signal having a primary common pilot channel; and
performing channel estimation on the received beam signal based on pilot signals received in the primary common pilot channel,
wherein the antenna signal is transmitted over an entire sector and the beam signal is transmitted over part of a sector and the channel estimation is additionally based on dedicated signals received in the dedicated physical channel wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor.

5. A method comprising:
receiving a beam signal having a dedicated channel at a receiver, the receiver having an adaptive antenna transmitter, wherein the communication system is a cellular system comprising a plurality of cells, each cell comprising at least one sector;
receiving an antenna signal at the receiver, the antenna signal having a primary common pilot channel; and
performing channel estimation on the received beam signal based on pilot signals received in the primary common pilot channel,
wherein the antenna signal is transmitted over an entire sector and the beam signal is transmitted over part of a sector and the channel estimation is additionally based on dedicated signals received in the dedicated physical channel wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor;
wherein the weight factor is calculated as:

$$\hat{\beta} = \frac{(1-\bar{\rho}) \cdot S\hat{N}R_{h_{DL-DPCCH}}}{(1-\bar{\rho}) \cdot S\hat{N}R_{h_{DL-DPCCH}} + \bar{\rho} S\hat{N}R_{h_{P-CPICH}}},$$

where $\bar{\rho}$ is the expectation value of the time variant correlation coefficient and $S\hat{N}R$ is the estimate of the signal-to-noise-ratio of the signal.

6. A method comprising:
receiving a beam signal having a dedicated channel at a receiver, the receiver having an adaptive antenna transmitter, wherein the communication system is a cellular system comprising a plurality of cells, each cell comprising at least one sector;

receiving an antenna signal at the receiver, the antenna signal having a primary common pilot channel; and performing channel estimation on the received beam signal based on pilot signals received in the primary common pilot channel, wherein the antenna signal is transmitted over an entire sector and the beam signal is transmitted over part of a sector and the channel estimation is additionally based on dedicated signals received in the dedicated physical channel wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor;

wherein the weight factor is calculated as:

$$\hat{\beta} = \frac{(1-\overline{\rho}) \cdot S\hat{N}R_{h_{DL-DPCCH}}}{(1-\overline{\rho}) \cdot S\hat{N}R_{h_{DL-DPCCH}} + \overline{\rho}S\hat{N}R_{h_{P-CPICH}}},$$

where $\overline{\rho}$ is the expectation value of the time variant correlation coefficient and $S\hat{N}R$ is the estimate of the signal-to-noise-ratio of the signal;

wherein the expectation value of the time variant correlation coefficient, $\overline{\rho}$, is calculated as $$\overline{\rho} = E\left[\frac{conj(\hat{h}_{P-CPICH}) \cdot \hat{h}_{DL-DPCCH}}{|\hat{h}_{P-CPICH}| \cdot |\hat{h}_{DL-DPCCH}|}\right],$$

wherein conj (·) is the complex conjugation of the argument.

7. An apparatus comprising:

a first input element configured to receive a beam signal;

a second input element configured to receive an antenna signal; and an estimator, connected to the second input element, configured to estimate parameters of the received beam signal based on information received in the antenna signal, wherein estimating the parameters includes channel estimation, wherein the antenna signal is transmitted in a communications system, the communications system comprising a plurality of cells and each cell comprising at least one sector and the antenna signal is transmitted over an entire sector and the beam signal is transmitted over part of a sector and the estimator is further connected to the first input element, and configured to estimate the channel based on information additionally received in the beam signal;

wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor.

8. An apparatus comprising:

a first input element configured to receive a beam signal;

a second input element configured to receive an antenna signal; and an estimator, connected to the second input element, configured to estimate parameters of the received beam signal based on information received in the antenna signal, wherein estimating the parameters includes channel estimation, wherein the antenna signal is transmitted in a communications system, the communications system comprising a plurality of cells and each cell comprising at least one sector and the antenna signal is transmitted over an entire sector and the beam signal is transmitted over part of a sector and the estimator is further connected to the first input element, and configured to estimate the channel based on information additionally received in the beam signal;

wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor;

wherein the weight factor is calculated as:

$$\hat{\beta} = \frac{(1-\overline{\rho}) \cdot S\hat{N}R_{h_{DL-DPCCH}}}{(1-\overline{\rho}) \cdot S\hat{N}R_{h_{DL-DPCCH}} + \overline{\rho}S\hat{N}R_{h_{P-CPICH}}},$$

where $\overline{\rho}$ is the expectation value of the time variant correlation coefficient and $S\hat{N}R$ is the estimate of the signal-to-noise-ratio of the signal.

9. An apparatus comprising:

a first input element configured to receive a beam signal;

a second input element configured to receive an antenna signal; and an estimator, connected to the second input element, configured to estimate parameters of the received beam signal based on information received in the antenna signal, wherein estimating the parameters includes channel estimation, wherein the antenna signal is transmitted in a communications system, the communications system comprising a plurality of cells and each cell comprising at least one sector and the antenna signal is transmitted over an entire sector and the beam signal is transmitted over part of a sector and the estimator is further connected to the first input element, and configured to estimate the channel based on information additionally received in the beam signal;

wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor;

wherein the weight factor is calculated as:

$$\hat{\beta} = \frac{(1-\overline{\rho}) \cdot S\hat{N}R_{h_{DL-DPCCH}}}{(1-\overline{\rho}) \cdot S\hat{N}R_{h_{DL-DPCCH}} + \overline{\rho}S\hat{N}R_{h_{P-CPICH}}},$$

where $\overline{\rho}$ the expectation value of the time variant correlation coefficient and $S\hat{N}R$ is the estimate of the signal-to-noise-ratio of the signal;

wherein the exoectation value of the time variant correlation coefficient, $\bar{\rho}$, is calculated as $$\bar{\rho} = E\left[\frac{conj(\hat{h}_{P-CPICH}) \cdot \hat{h}_{DL-DPCCH}}{|\hat{h}_{P-CPICH}| \cdot |\hat{h}_{DL-DPCCH}|}\right],$$

wherein conj (·) is the complex conjugation of the argument.

10. An apparatus comprising:
first input means for receiving a beam signal;
second input means for receiving an antenna signal; and
estimating means, connected to the second input means, for estimating parameters of the received beam signal based on information received in the antenna signal,
wherein estimating the parameters includes channel estimation,
wherein the antenna signal is transmitted in a communications system, the communications system comprising a plurality of cells and each cell comprising at least one sector and the antenna signal is transmitted over an entire sector and the beam signal is transmitted over part of a sector and the estimating means is further connected to the first input means, for estimating the channel based on information additionally received in the beam signal;
wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor.

11. An apparatus, comprising:
first input means for receiving a beam signal;
second input means for receiving an antenna signal; and
estimating means, connected to the second input means, for estimating parameters of the received beam signal based on information received in the antenna signal,
wherein estimating the parameters includes channel estimation,
wherein the antenna signal is transmitted in a communications system, the communications system comprising a plurality of cells and each cell comprising at least one sector and the antenna signal is transmitted over an entire sector and the beam signal is transmitted over part of a sector and the estimating means is further connected to the first input means, for estimating the channel based on information additionally received in the beam signal;
wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor;

wherein the weight factor is calculated as:

$$\hat{\beta} = \frac{(1-\bar{\rho}) \cdot S\hat{N}R_{h_{DL-DPCCH}}}{(1-\bar{\rho}) \cdot S\hat{N}R_{h_{DL-DPCCH}} + \bar{\rho}S\hat{N}R_{h_{P-CPICH}}},$$

where $\bar{\rho}$ is the expectation value of the time variant correlation coefficient and $S\hat{N}R$ is the estimate of the signal-to-noise-ratio of the signal.

12. An apparatus comprising:
first input means for receiving a beam signal;
second input means for receiving an antenna signal; and
estimating means, connected to the second input means, for estimating parameters of the received beam signal based on information received in the antenna signal,
wherein estimating the parameters includes channel estimation,
wherein the antenna signal is transmitted in a communications system, the communications system comprising a plurality of cells and each cell comprising at least one sector and the antenna signal is transmitted over an entire sector and the beam signal is transmitted over part of a sector and the estimating means is further connected to the first input means, for estimating the channel based on information additionally received in the beam signal;
wherein the channel is estimated as:

$$\hat{h}_{joint} = \hat{\beta}\hat{h}_{DL-DPCCH} + (1-\hat{\beta})\hat{h}_{P-CPICH}$$

wherein $\hat{h}_{P-CPICH}$ is a channel estimate obtained from the antenna signal and $\hat{h}_{DL-DPCCH}$ is a channel estimate obtained from the beam signal, and $\hat{\beta}$ is a weight factor;
wherein the weight factor is calculated as:

$$\hat{\beta} = \frac{(1-\bar{\rho}) \cdot S\hat{N}R_{h_{DL-DPCCH}}}{(1-\bar{\rho}) \cdot S\hat{N}R_{h_{DL-DPCCH}} + \bar{\rho}S\hat{N}R_{h_{P-CPICH}}},$$

where $\bar{\rho}$ is the expectation value of the time variant correlation coefficient and $S\hat{N}R$ is the estimate of the signal-to-noise-ratio of the signal;
wherein the expectation value of the time variant correlation coefficient, $\bar{\rho}$, is calculated as $$\bar{\rho} = E\left[\frac{conj(\hat{h}_{P-CPICH}) \cdot \hat{h}_{DL-DPCCH}}{|\hat{h}_{P-CPICH}| \cdot |\hat{h}_{DL-DPCCH}|}\right],$$

wherein conj (·) is the complex conjugation of the argument.

* * * * *